(12) United States Patent
Bosen

(10) Patent No.: US 6,508,619 B1
(45) Date of Patent: Jan. 21, 2003

(54) EXPANSION TURBINE FOR LOW-TEMPERATURE APPLICATIONS

(75) Inventor: Werner Bosen, Köln (DE)

(73) Assignee: Atlas Copco Energas GmbH, Köln (DE)

(*) Notice: Subject to any disclaimer, the term of this patent is extended or adjusted under 35 U.S.C. 154(b) by 0 days.

(21) Appl. No.: 09/953,791

(22) Filed: Sep. 17, 2001

(30) Foreign Application Priority Data

Jul. 6, 2001 (EP) ............................................. 01116417

(51) Int. Cl.$^7$ ............................................... F01D 25/16
(52) U.S. Cl. .................... 415/111; 415/175; 415/177; 415/180; 415/229; 415/230; 384/476; 384/493; 384/905; 384/907.1
(58) Field of Search .............................. 415/111, 112, 415/229, 230, 231, 175, 177, 180; 384/476, 493, 905, 907.1

(56) References Cited

U.S. PATENT DOCUMENTS

| | | | | |
|---|---|---|---|---|
| 2,165,994 A | * | 7/1939 | Zerokwitz | 415/111 |
| 2,529,880 A | * | 11/1950 | McClure | 415/111 |
| 4,285,632 A | * | 8/1981 | DeSalve | 415/175 |
| 4,786,238 A | | 11/1988 | Glaser et al. | |
| 5,538,558 A | * | 7/1996 | Ookouchi et al. | 384/907.1 |
| 5,993,069 A | | 11/1999 | Cole et al. | |
| 6,390,683 B1 | * | 5/2002 | Hirose et al. | 384/476 |

FOREIGN PATENT DOCUMENTS

| | | |
|---|---|---|
| DE | 37 15 225 | 11/1987 |
| DE | 199 10 579 | 9/2000 |
| EP | 0 256 518 | 2/1988 |
| EP | 0 454 616 | 10/1991 |
| JP | 59 161201 | 9/1984 |
| JP | 03 191262 | 8/1991 |
| JP | 11 247870 | 9/1999 |
| WO | 99 43927 | 9/1999 |

* cited by examiner

Primary Examiner—Christopher Verdier
(74) Attorney, Agent, or Firm—Collard & Roe, P.C.

(57) ABSTRACT

An expansion turbine for low-temperature applications containing a turbine stage into which a cold gas is admitted. A turbine rotor is mounted on a shaft. Also provided is a roller support for the shaft being lubricated with a minimum amount of oil or grease. The roller support contains a roller bearing located adjacent to the turbine stage. The roller bearing is comprised of an inner bearing ring, rollers, and an outer bearing ring supported on the side of the housing. An insulating bush made of ceramic engineering material is arranged between the inner bearing ring and the shaft. The bush thermally separates the inner bearing ring from the cold shaft.

4 Claims, 1 Drawing Sheet

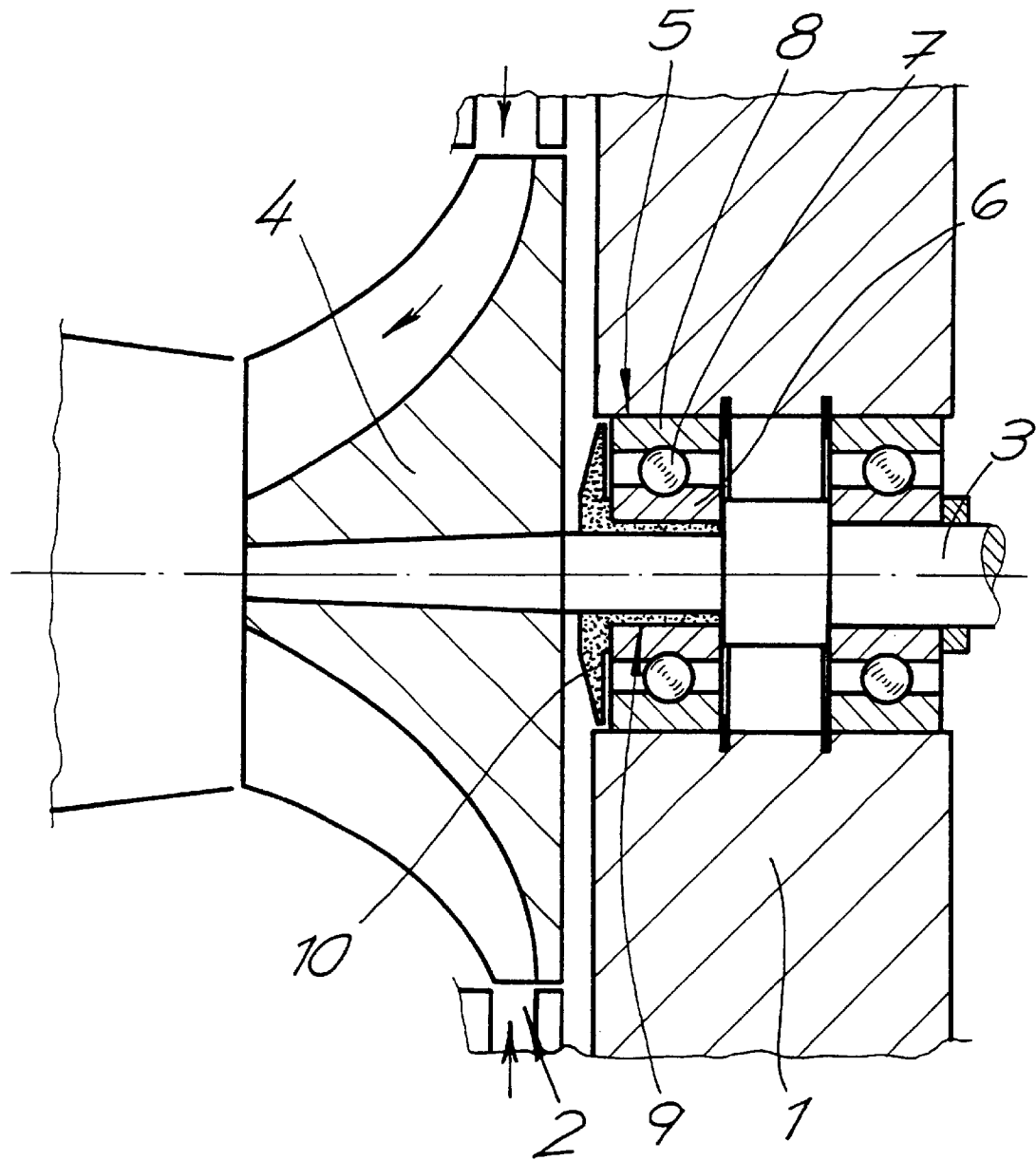

EXPANSION TURBINE FOR LOW-TEMPERATURE APPLICATIONS

BACKGROUND OF THE INVENTION

1. Field of the Invention

The invention relates to an expansion turbine for low-temperature applications.

2. The Prior Art

The rotor of a turbine is connected with a metallic shaft over a large metal contact surface area with high contact pressure. The shaft forms a heat bridge in which a large flow of heat is dissipated into the turbine stage from the chamber receiving the roller bearing. The flow of heat being dissipated causes the roller support to falter. The danger that the lubricant may no longer be capable of flowing due to cooling and thus lose its lubricating power, is particularly pronounced with roller bearings lubricated with grease or a minimum amount of oil. The loss of heat of the roller bearings during rotation often makes it impossible to safely maintain the lubricant in a liquid state. Therefore, in low-temperature applications, roller bearings supporting the shaft of the rotor of an expansion turbine that are lubricated with a minimum amount of oil or with grease present serious problems.

SUMMARY OF THE INVENTION

An object of the present invention is to provide an expansion turbine for low-temperature applications having adequate cold insulation for the roller bearing on the turbine side. Therefore, interface lubrication and thus the function of the roller bearing during operation are assured.

These and other objects are accomplished by providing an insulating bush made of ceramic engineering material arranged between the inner ring of the roller bearing and the shaft. The insulating bush thermally separates the inner ring of the bearing from the cold shaft. According to another embodiment of the invention, the insulating bush has a disk-shaped shoulder on the turbine side that seals the space of the roller bearing of the turbine chamber from a loss of lubricant and thermally insulates this space. The disk-shaped shoulder has two functions: it acts as a centrifugal ring that prevents lubricant from exiting the space of the roller bearing, and it forms an insulating body that reduces the dissipation of heat from the space of the roller bearing into the turbine stage. It is also possible to substitute a separate disk for the disk-like shoulder made of the ceramic material. This separate disk is arranged on the shaft and seals the space of the roller bearing of the turbine stage against loss of lubricant and thermally separates it from the turbine stage.

The ceramic engineering material used for producing the insulating bush has low thermal conductivity, whereby the linear coefficient of thermal expansion of the material deviates not much from the steel grades used for producing the shaft and the inner ring of the bearing. Because the coefficients of thermal expansion of the materials are similar, it is assured in low-temperature applications that the minor installed clearance required for the function of high-precision roller bearings is maintained. In addition, the roller bearings are not thermally distorted and the inner bearing rings do not become detached. The ceramic engineering material of the insulating bush may have a thermal conductivity of 1.9 to 2.5 W/(mK) and comprises zirconium oxide and contains additions such as, for example yttrium oxide for stabilizing its structure.

BRIEF DESCRIPTION OF THE DRAWING

Other objects and features of the present invention will become apparent from the following detailed description considered in connection with the accompanying drawing. It is to be understood, however, that the drawing is designed as an illustration only and not as a definition of the limits of the invention.

The drawing shows a schematic of a longitudinal sectional view through an expansion turbine for low-temperature applications according to the present invention.

DETAILED DESCRIPTION OF THE PREFERRED EMBODIMENT

The expansion turbine contains a bearing housing 1 with a turbine stage 2, to which a cold gas is admitted. A turbine rotor 4 is arranged in an overhung position, and a roller support in the shaft that is lubricated with a minimum amount of oil or with grease. The roller support comprises a roller bearing 5 neighboring the turbine stage 2, an inner bearing ring 6, rollers 7, and an outer bearing ring 8 supported on the side of the housing.

The cold gas has a temperature between −50° C. and −160° C. and enters turbine stage 2 along the periphery of turbine rotor 4 and is cooled in the expansion turbine to −100° C. to −200° C. Turbine rotor 4 is connected with the end of shaft 3, which is made of high-strength, heat-treatable steel via a large metal contact surface area under high contact pressure. Shaft 3 forms a heat bridge. To maintain the lubricant of the roller bearing in a liquid state, a cold insulation located adjacent to turbine stage 2 is required for roller bearing 5. An insulating bush 9 made of ceramic engineering material is provided for this purpose. Bush 9 is disposed between inner bearing ring 6 and shaft 3. Insulating bush 9 thermally separates inner bearing ring 6 from cold shaft 3. Furthermore, insulating bush 9 has a disk-shaped shoulder 10 located on the side of the turbine, which thermally insulates the space of the roller bearing from turbine chamber 2 and, seals it against loss of lubricant. Instead of using the disk-shaped shoulder 10 it is possible to use a separate disk made of ceramic engineering material, this disk being arranged on the shaft 3. The insulating bush 9 is seated on the shaft 3 in a fixed manner. When shaft 3 is rotating, disk-shaped shoulder 10 or the separate disk acts as a centrifugal ring preventing lubricant from exiting from the space of the roller bearing.

As compared to steel, the ceramic engineering material employed for producing insulating bush 9 has a very low thermal conductivity of from 1.9 to 2.5 W/(mK). The coefficient of thermal expansion deviates not much from the values of the steel grades that can be employed for shaft 3 and inner bearing ring 6. This safely prevents any impermissible thermal distortion or detachment of roller bearing 5 in low-temperature operations with the very small installed clearance required for the function of a high-precision antifriction bearing.

The ceramic engineering material of insulating bush 9 can be made of zirconium oxide, with additions such as, for example yttrium oxide for stabilizing the structure.

What is claimed is:

1. An expansion turbine for low-temperature applications, comprising:

a shaft;

a turbine stage into which cold gas is admitted;

a turbine rotor mounted to the shaft;

a roller support on the shaft, said roller support being lubricated with oil; the roller support comprising:
a roller bearing disposed next to the turbine stage, wherein said roller bearing comprises an inner bearing ring; rollers; and an outer bearing ring supported on the side of a housing; and
an insulating bush comprising ceramic engineering material disposed between said inner bearing ring and the shaft, wherein the insulating bush thermally separates said inner bearing from the shaft.

2. The expansion turbine according to claim 1, wherein the insulating bush comprises a disk-shaped shoulder on a side of the turbine, said shoulder sealing a space between the roller bearing and the turbine stage and thermally insulating the space.

3. The expansion turbine according to claim 1, further comprising a disk made of ceramic engineering material mounted on the shaft, said disk sealing the space between the roller bearing and the turbine stage from loss of lubricant and thermally insulating the space.

4. The expansion turbine according to claim 3, wherein the ceramic engineering material of the insulating bush (9) and of the disk has a thermal conductivity of 1.9 to 2.5 W/(mK).

* * * * *